United States Patent [19]

Wistehuff

[11] Patent Number: 4,900,378
[45] Date of Patent: Feb. 13, 1990

[54] METHOD FOR MAKING A DECORATIVE PANEL

[75] Inventor: Daniel D. Wistehuff, Hickory, N.C.

[73] Assignee: Ladd Furniture, Inc., High Point, N.C.

[21] Appl. No.: 28,106

[22] Filed: Mar. 19, 1987

[51] Int. Cl.$^4$ .............................................. B44C 3/12
[52] U.S. Cl. .................................... 156/63; 156/265; 156/297; 428/105; 428/542.6
[58] Field of Search .................. 156/63, 265, 297, 299; 428/151, 537.1, 542.6, 903.3, 2, 105, 106; D6/369; 144/333; 52/DIG. 9

[56] References Cited

U.S. PATENT DOCUMENTS

| D. 254,411 | 3/1980 | Olko | D6/369 |
|---|---|---|---|
| D. 270,021 | 8/1983 | Claman | D6/369 |
| 1,420,220 | 6/1922 | Roux | 52/DIG. 9 X |
| 3,438,840 | 4/1969 | George | 156/63 X |
| 4,045,262 | 8/1977 | Enzinger et al. | 156/62.2 |
| 4,473,605 | 9/1984 | Rausch | 428/17 |
| 4,690,874 | 9/1987 | Sauer et al. | 428/537.1 |
| 4,758,478 | 7/1988 | Daisy et al. | 156/335 |

FOREIGN PATENT DOCUMENTS 2084212  4/1982  United Kingdom ........... 52/DIG. 9

OTHER PUBLICATIONS

*Interiors,* Oct. 1984, p. 34.

*Primary Examiner*—Michael W. Ball
*Assistant Examiner*—Jeff H. Aftergut

[57] ABSTRACT

A decorative furniture panel and process for making same formed by aligning a plurality of roundcore members in a predetermined relationship to form a wave-like design, bonding the aligned roundcore members to a holding member, joining the aligned members and the holding member to a substantially flat straightening member having a low moisture content to enable the moisture stabilization of the joined components, and encircling all of the members with a frame to hide member edges and form a substantially flat panel of a predetermined size for use in the construction of furniture.

6 Claims, 3 Drawing Sheets

METHOD FOR MAKING A DECORATIVE PANEL

BACKGROUND, BRIEF SUMMARY AND OBJECTIVES OF THE INVENTION

This invention relates to decorative furniture panels and more particularly to furniture panels formed by a laminating method utilizing roundcore members arranged in a planar relationship to form a wave-like design.

Panels to form items of furniture are conventionally cut to presized dimensions, covered with veneer, fabric, or other decorative substances, and strategically placed in the construction process to develop an artistically appealing item of furniture. The present invention relates to a conventional process of forming furniture panels but is directed to a more specific process resulting in a unique panel having unusually attractive consumer appeal.

The present invention in its simplest form is a uniquely designed furniture panel and method for making the panel which is formed by aligning a plurality of roundcore members in a predetermined relationship to form a wave-like design, affixing these aligned members to a holding member which may or not be substantially rigid, joining these aligned members and the holding member to a flat, substantially flat straightening member having a low moisture content; and encapsulating all of these members with a frame to hide the member edges and form a flat panel for use in the construction of furniture.

From the foregoing, it can be seen that a principal objective of the present invention is to produce a furniture panel of a unique design to be used in the construction of conventional furniture case goods.

A further objective of the present invention is to provide a novel method for producing unique furniture panels involving the alignment of a plurality of roundcore members in a predetermined relationship to form a wave-like design.

Yet another objective of the present invention is to provide a furniture panel including a flat straightening member having a low moisture content which is capable of stabilizing the moisture content of all components of the panel and thus avoid warping.

Yet still another objective of the present invention is to provide a furniture panel capable of being constructed in steps involving one or more locations whereby the components of the panel can ultimately be assembled at a single location in a finished relationship.

Yet still another, further objective of the present invention is to provide a furniture panel that is relatively inexpensive in construction, uses relatively inexpensive common raw materials, and can be efficiently fabricated.

These and other objectives of the present invention can be readily determined after consideration of the following detailed description taken in conjunction with the accompanying drawings wherein like characters of reference designate like parts throughout the several views.

DRAWINGS

DETAILED DESCRIPTION OF THE INVENTION

Figure 1:
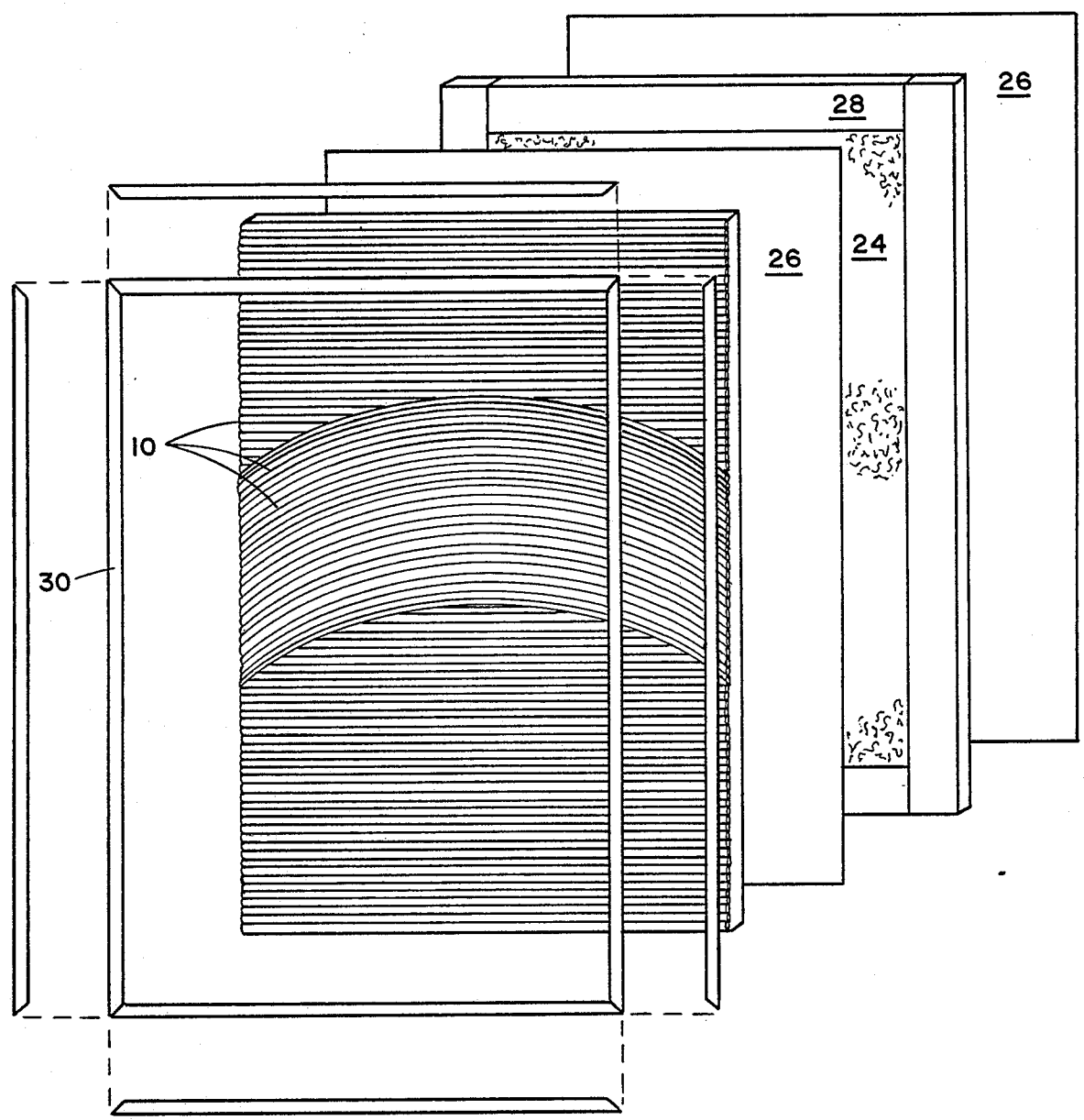
FIG. 1 is a perspective and exploded view of the panel comprising a portion of the present invention showing the wavelike design formed by the aligned plurality of round core members, a holding member affixed to the aligned roundcore members, and a flat straightening member including a particle board core and two veneer covers.
Figure 3:
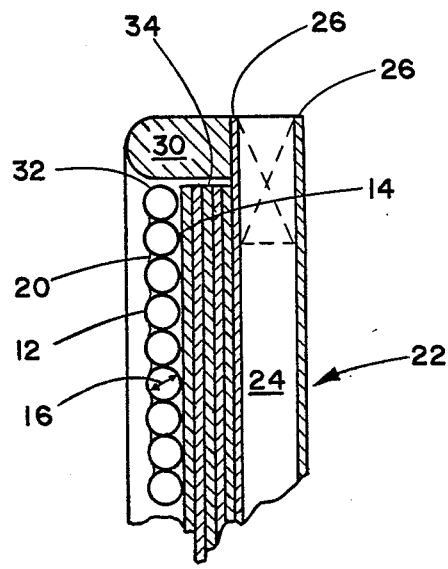
FIG. 3 is a side elevational, sectional and enlarged view of the panel forming a part of the present invention showing the complete formation of the roundcore members joined to a holding member and both the roundcore and holding members affixed to a straightening member.
Figure 2:
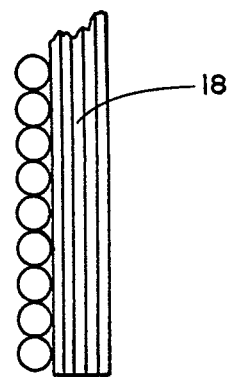
FIG. 2 is a side elevational, enlarged and sectional view of the aligned plurality of roundcore members joined to a holding member formed from a plywood section.

Referring now to the figures and particularly FIG. 1, a plurality of roundcore members 10 is aligned in a predetermined relationship, in this instance a wave-like design alternating with a horizontal pattern. The aligned roundcore members have an outer surface 12 (FIG. 3) and an inner surface 14 (FIG. 14), and each of the members is of substantially the same diameter 16. Roundcore members 10 are aligned in a substantially and contiguous relationship (a flat plane) and are affixed along inner surfaces 14 to a substantially flat holding member 18 which can be of any suitable substance, most often a section of conventionally constructed plywood. The aligned plurality of roundcore members forming a layer of a single roundcore member thickness can be joined to the holding member by staples, glue, a combination thereof, or other suitable joining means.

The outer surface of the aligned roundcore members is usually treated with a filling and finishing substance so that a more polished and finished appearance is given to the surface which will become the exterior of the furniture piece. The filler 20 can be of any conventional composition and can be applied to the outer surface of the roundcore members after they have been joined to the holding member or at a later time in the fabricating process. The filled outer surfaces of the roundcore members may be sanded if desired.

The joined roundcore and holding members are next affixed to a straightening member shown generally as 22 which is comprised of a core member 24 preferably formed from particle board or some other hard and warp-resisting substance and which is covered by two layers of veneer 26 which serve to provide surfaces readily suitable for bonding against other components. It has been found desirable to provide an interior frame 28 surrounding the edges of the particle board core 24 to resist chipping or particlizing that might occur without the frame when the particle board abuts an adjacent surface.

The particle board should be dried so that its moisture content ranges from about 6% to about 12%. This low moisture conent will allow the straightening member to stabilize moisture content throughout the panel and thereby warping of the entire panel.

The panel may be finished by encapsulating the aligned roundcore members and the holding member with a frame 30 which will conceal the edges of the aligned roundcore memberw 32 and the holding member 34. Thus the panel is aesthetically dressed within the frame formed from a preselected molding of a particular design which can be formed separately or in combination with the joined roundcore and holding members after they have been assembled.

The present invention can be practiced in more than one plant location so that, for example, the aligned roundcore members can be joined to a holding member in one location, shipped to a second location where the joined members are affixed to a straightening member, and thereafter sent to another location where the molding 30 is applied. The joined roundcore and holding members can be cut at one location to a predetermined size, and the straightening members can be cut at a separate location in equally suitable sizes so that all can be joined at a third location in one operation.

Figure 4:
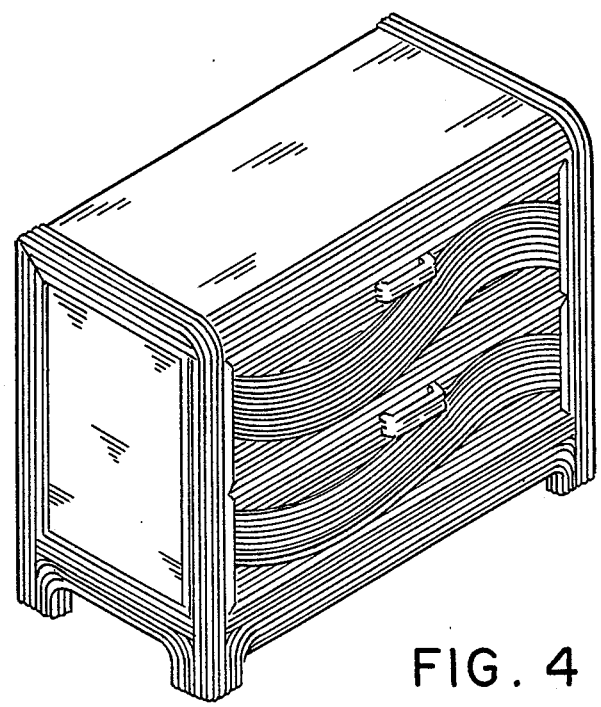
FIG. 4 is a perspective view of a furniture chest wherein the draw fronts are formed from panels comprising the present invention.
Figure 5:
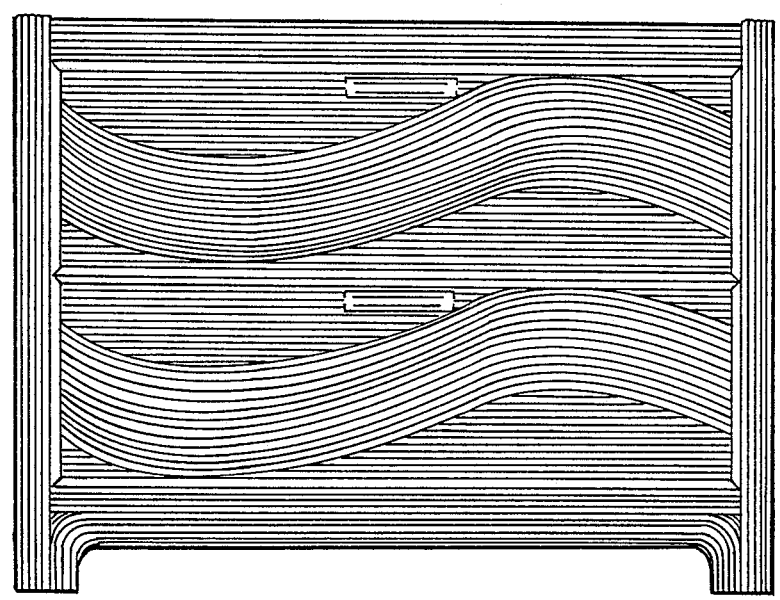
FIG. 5 is a front elevational view of the furniture chest shown in FIG. 4 wherein the drawer fronts are panels forming the present invention.

The wave-like patterns formed by the alignment of the roundcore members in a substantially flat plane can be of any configuration and not necessarily like that shown in FIG. 1. A variation of the wave-like design is shown in FIGS. 4 and 5 where the panel forms the drawer fronts of the drawers of a furniture chest. Obviously, numerous variations are feasible and are limited only by the imagination of the designer.

Doors, bed panels, base aprons on case pieces, bed footboards, occasional and dining tables, corners of legs and radius corners of end panel overlays are equally adaptable to utilizing the present invention. In many instances, the frame formed by a preselected molding design can be omitted to allow direct abutment to another roundcore member surface.

Many variations can be made in the alignment of the roundcore members, the holding member, and the straightening member without departing from the spirit and scope of the present invention. Such modifications are contemplated, and it is the intent to be limited only by the scope of the claims appended hereto.

What is claimed is:

1. A process for making furniture panels including the steps of: aligning a plurality of roundcore members of substantially equal diameter in a side by side and contiguous relationship, each having an outer surface and inner surface, in a fixed relationship to form a predetermined design; affixing the inner surfaces of the aligned members to a substantially flat holding member; and joining the aligned members and holding member to a flat straightening member with a moisture content from 6% to about 12% having an inner and outer surface; first and second veneer coverings affixed to the inner and outer member surfaces; and cutting the roundcore members, the holding member and the straightening member to a predetermined size after they are joined to form a furniture article component of a predetermined size and configuration.

2. The process as claimed in claim 1 wherein the roundcore members are aligned in a substantially flat plane.

3. The process as claimed in claim 2 included the additional step of filling the outer surface of the aligned roundcore members where the substantially flat holding member is made of wood.

4. The process as claimed in claim 3 including the additional step of sanding the filled outer surface of the roundcore members.

5. The process as claimed in claim 3 including the step of encapsulating all of the members with a frame to conceal member edges and form a flat panel for use in the construction of furniture.

6. A process for making furniture panels including the steps of: aligning a plurality of roundcore members having an outer surface and an inner surface in a substantially flat and contiguous relationship to form a predetermined wave-like design, the roundcore members being aligned in a substantially flat plane of a single roundcore member thickness and being of substantially the same diameter; of fixing the inner surface of the aligned members to a substantially flat plywood holding member; joining the aligned single thickness roundcore members and holding member to a flat straightening member having a moisture content of from about 6% to about 12%, the straightening member formed from a particle board core having inner and outer surfaces and veneer coverings bounded to the inner and outer surfaces; and encapsulating all of the members with a frame to conceal member edges and form a finished, rigid and flat furniture article component of a predetermined size and configuration.

* * * * *